United States Patent [19]

Whitford

[11] Patent Number: 4,818,546
[45] Date of Patent: Apr. 4, 1989

[54] METHOD OF SPRAYING GRAPES WITH PRESERVATIVE LIQUID

[75] Inventor: Darryl R. Whitford, Rosedale, Australia

[73] Assignee: S Smith & Son Pty Ltd., Australia

[21] Appl. No.: 69,871

[22] Filed: Jul. 6, 1987

[51] Int. Cl.⁴ ............................................. A23B 7/16
[52] U.S. Cl. ................................... 426/231; 426/310; 426/326
[58] Field of Search ............... 426/231, 310, 321, 326, 426/335; 422/300

[56] References Cited

U.S. PATENT DOCUMENTS

| | | | |
|---|---|---|---|
| 3,533,810 | 10/1970 | Shillington et al. | 426/335 |
| 3,604,435 | 9/1971 | Day et al. | 134/151 |
| 3,928,577 | 12/1975 | Kochurova et al. | 426/326 |
| 3,969,192 | 7/1976 | Struck | 134/151 |

Primary Examiner—George Yeung
Attorney, Agent, or Firm—Brown, Martin, Haller & Meador

[57] ABSTRACT

A method of spraying grapes, comprising traversing harvested grapes from a harvester into a bin, and spraying a series of pulses of preservative liquid over the harvested grapes before they enter the bin, and adjusting either the "OFF" time or the "ON" time of the pulses so that the spray quantity is matched to the harvesting rate.

4 Claims, 4 Drawing Sheets

METHOD OF SPRAYING GRAPES WITH PRESERVATIVE LIQUID

This invention relates to apparatus for the spraying of grapes with preservative liquids immediately upon harvesting. vesting.

It is considered essential to adjust pH and sulphur levels as soon as practical after picking grapes to ensure that deterioration of the grapes is inhibited.

When grapes are picked with mechanical harvesters, they are normally traversed to a storage bin carried on the harvester or towed behind the harvester, by being first deposited onto a conveyor, and elevated by the conveyor to be discharged into the storage bin. The action on the grapes of mechanically removing them from the vines, depositing them on the conveyor and discharging into a bin results in bruising and splitting of many of the berries. When this occurs, the juice becomes exposed to the air and is immediately partially oxidised, and even more seriously, the yeast which is present in a vineyard is likely to contaminate the grape juice, rapidly multiplying in the grape sugar.

To inhibit this deleterious contamination, preservative liquids are applied, both to increase the sulphur level and to reduce the pH level, thereby inhibiting both oxidation and yeast contamination.

For the increase of the sulphur level, a concentrated solution of 95 grams per liter of potassium metabisulphite and 33 grams per liter of sodium erythorbate are mixed together to provide a stock solution which is diluted to a range of between 25% to 85% for "dosing" at the harvester. The different dilution rates provide for different levels of addition to the grapes depending on a number of factors, including variety, ambient temperature etc.

For the reduction of the pH, a concentrated solution of 500 grams per liter of either 100 liters of tartaric acid or a combination of tartaric and malic acid provide a stock solution which is diluted to a range of between 22% and 90%. Again the different levels of addition are selected depending upon the factors such as variety, ambient temperature and the like.

Acid is added in combination with sulphur dioxide and has the effect of lowering the pH in the grape juice as it drains away from broken berries, and for a given level of sulphur dioxide, the lower the pH the greater the sulphur level available for antioxidant action. For example at 3.00 pH there is approximately 3.7 more molecular sulphur for a given solution than at 3.6 pH. The sulphur dioxide is derived from potassium metabisulphite, which is a very stable source.

The above art is well-known and is commonly practised, but the conventional means for applying the acid/sulphur solution is usually to apply a very fine spray, operated by an adjustable volume pump spraying the solutions over the grapes as they are picked. However several problems arise utilising this method: (a) The acid or sulphur solution which is required per tonne of grapes is usually in the range from 2 to 5 liters. It can take between 15 and 40 minutes to pick the tonne of grapes, and consequently very small orifice jets are needed in order to meter this small amount of solution over such a long period of time.

(b) The small jets often block, and require repeated cleaning and inspection.

(c) The very fine droplet spray which emanates from small jets is likely to be blown away from the grapes by wind or other air draughts, and this results in a very spasmodic control.

(d) It is difficult to adjust the spray amount as the picking rate varies.

The main object of this invention is to provide a means and method whereby the grapes will be effectively dosed with a preservative liquid and yet the loss of liquid due to wind action will be largely reduced, and the danger of inaccurate dosage due to jet blockage will also be substantially reduced.

BRIEF SUMMARY OF THE INVENTION

Briefly in this invention, the means for spraying grapes with preservative liquid immediately upon harvesting is to control a power actuated pump to effect an intermittent discharge of the liquid through spray jets as a series of pulses, and control the "OFF" time between pulses or the "ON" time of the pulses so as to match the total dosage with the grape picking rate.

The invention also relates to a method of spraying grapes, and this comprises traversing harvested grapes from a harvester into a bin, and spraying a series of pulses of preservative liquid over the harvested grapes before they enter the bin, and adjusting either the "OFF" time or the "ON" time of the pulses so that the spray quantity is matched to the harvesting rate.

More specifically, in this invention means for spraying grapes with preservative liquid immediately upon harvesting comprises at least one spray jet located above traverse of the grapes before they enter the bin, at least one reservoir for containing the liquid, a power actuated pump and conduit means between the reservoir and jet, solenoid valves in said conduit means, and electronic control means coupled to the valves to control the valves to effect intermittent discharge of liquid through the spray jet as a series of pulses, electronic control means controlling at least one of "OFF" time between pulses and "ON" time of pulses.

Further, the method of spraying grapes with liquid immediately upon harvesting comprises traversing harvested grapes and depositing the harvested grapes into a bin, spraying a series of pulses of preservative liquid over the harvested grapes before they enter the bin, and adjusting at least one of "OFF" time between the pulses and "ON" time of pulses to match the quantity of sprayed preservative with the harvesting rate.

BRIEF DESCRIPTION OF THE DRAWINGS

An embodiment of the invention is described hereunder in some detail with reference to and as illustrated in the accompanying drawings in which.

Figure 1:
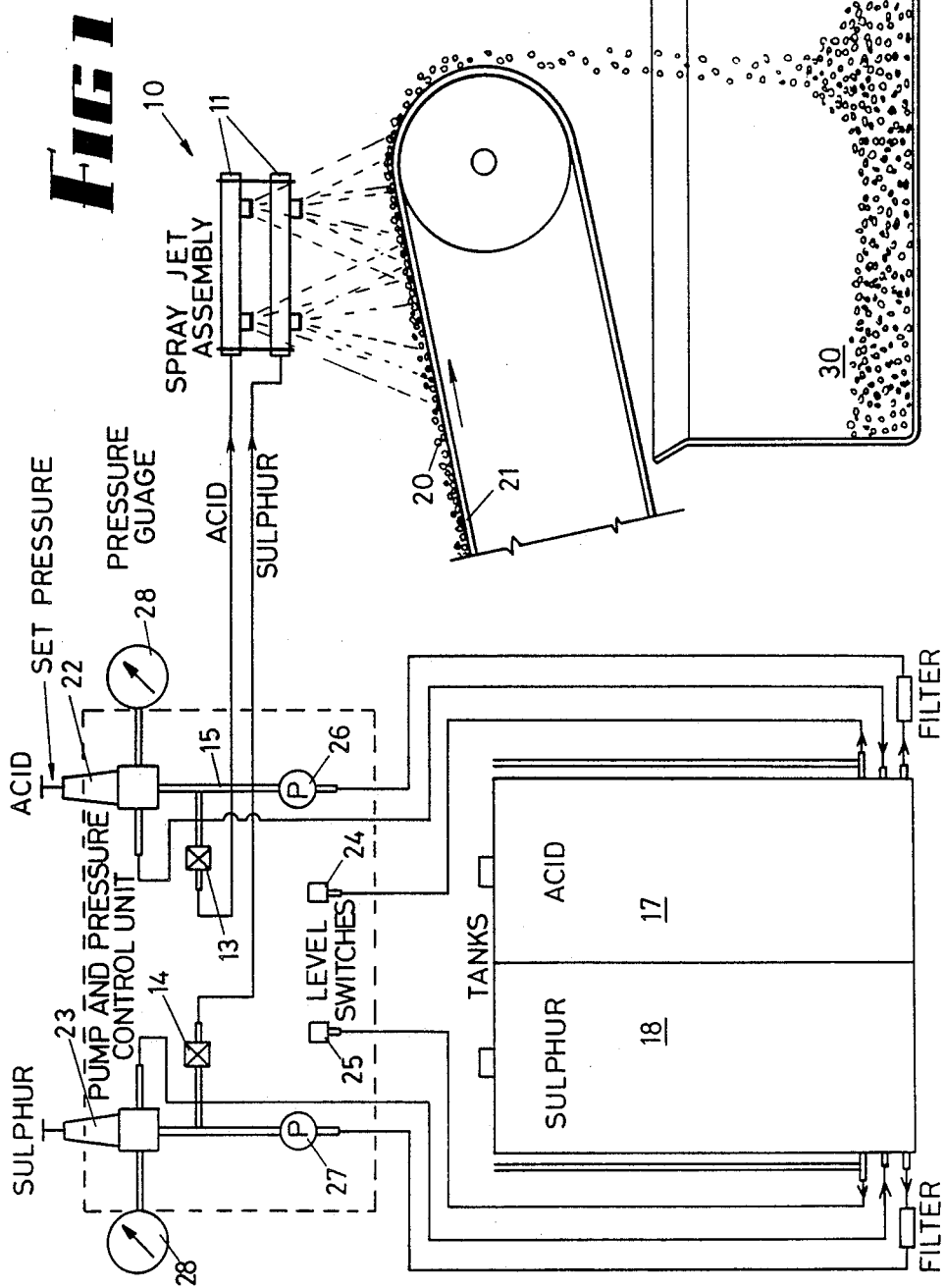
FIG. 1 is a diagrammatic layout which illustrates tanks, pumps, spray jets and harvester conveyor.

Referring first to FIG. 1, a jet spray assembly 10 consists of two manifolds 11, each manifold 11 having two spray jets 12.

Each spray jet 12 is selected to have a relatively large orifice so that the total spray requirement for a given quantity of harvested grapes (for example 1 tonne) will not be excessive provided the jets function in a pulsating manner.

The respective manifolds 11 are connected by solenoids 13 and 14 to respective conduits 15 and 16 for delivery respectively of an acid solution from the acid reservoir 17 and the sulphur reservoir 18. These reservoirs respectively contain solutions of potassium metabisulphite and sodium erythorbate, and tartaric and malic acid. The preservatives are not mixed until such time as they encounter harvested grapes 20 on a conveyor 21 of a harvester (not shown). Respective pressure valves 22 and 23 set the pressure for the sprays (usually about 55 kPa) Level switches 24 and 25 disable the circuit if the level of the acid or sulphur solutions drop below the incoming conduit to the respective pumps 26 and 27 so that the pumps are not damaged. Respective pressure gauges 28 are for consulting purposes only by an operator.

The discharge end of conveyor 21 is above a bin 30, and it is in the base of this bin 30 that grape juice is likely to collect which is subject to oxidation or contamination with wild yeast. Although a pulsing spray (as described hereunder) covers only some of the grapes being traversed at any one time, the grapes are so thoroughly mixed when being discharged into the bin 30 that they may be regarded as being homogeneously innoculated by the dosing preservatives.

Figure 2:
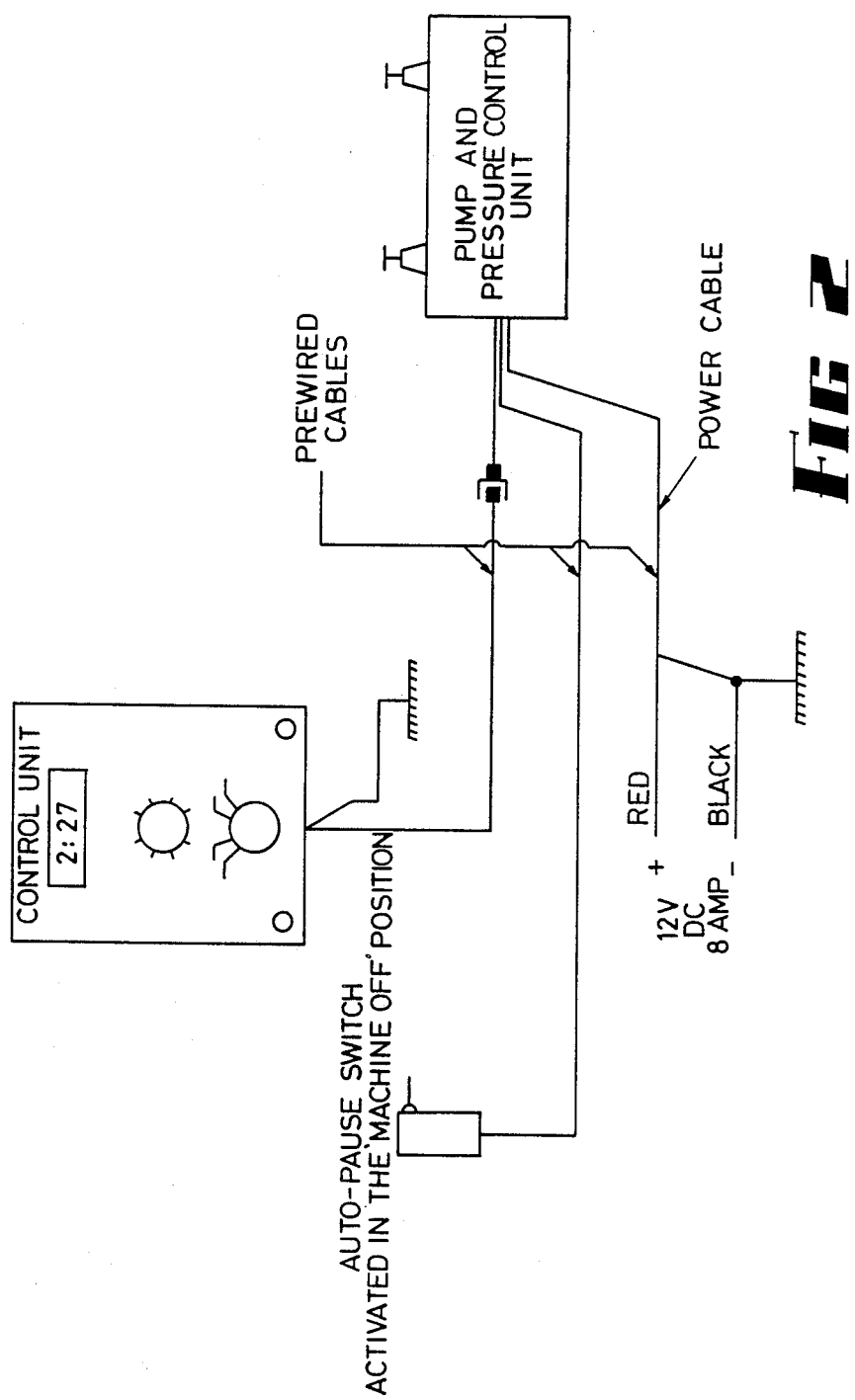
FIG. 2 illustrates diagrammatically the electrical arrangement.
Figure 3:
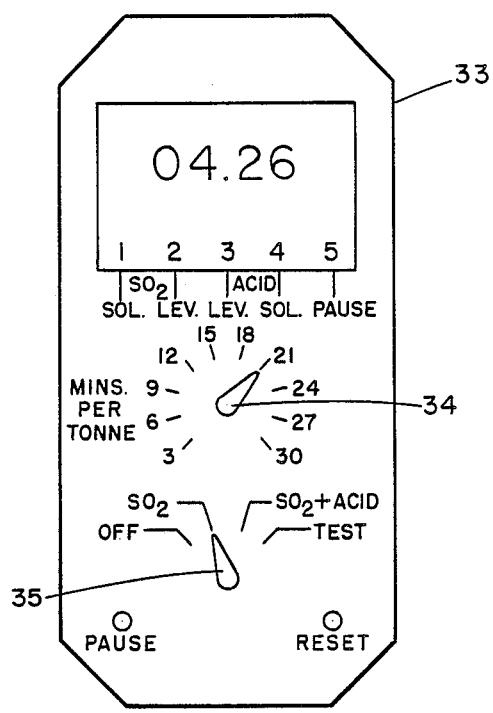
FIG. 3 is a front elevation of the control unit for controlling the "OFF" and "ON" pulses and FIG. 4 is a detailed circuit of the electronic pulsing control.

FIG. 2 illustrates the electrical connections as said above, and shows a control unit 33 (shown in more detail in FIG. 3) the control unit having a calibration control knob 34 and a selector switch 35. An auto pause switch 36 is activated when the harvester machine is in the "MACHINE OFF" position so that excessive dosing does not take place for example at the end of rows of vines.

In operation, each of the respective pumps 26 and 27 pumps solution from its tank 17 or 18 through a respective regulator 28 so that pressure is maintained at a set value. The pumps are preferably of the duplex diaphragm type and are run continuously. They do not switch off until either the level switches 24 or 25, or the auto pause switch 36 cause the circuit to be disabled as described above.

Figure 4:
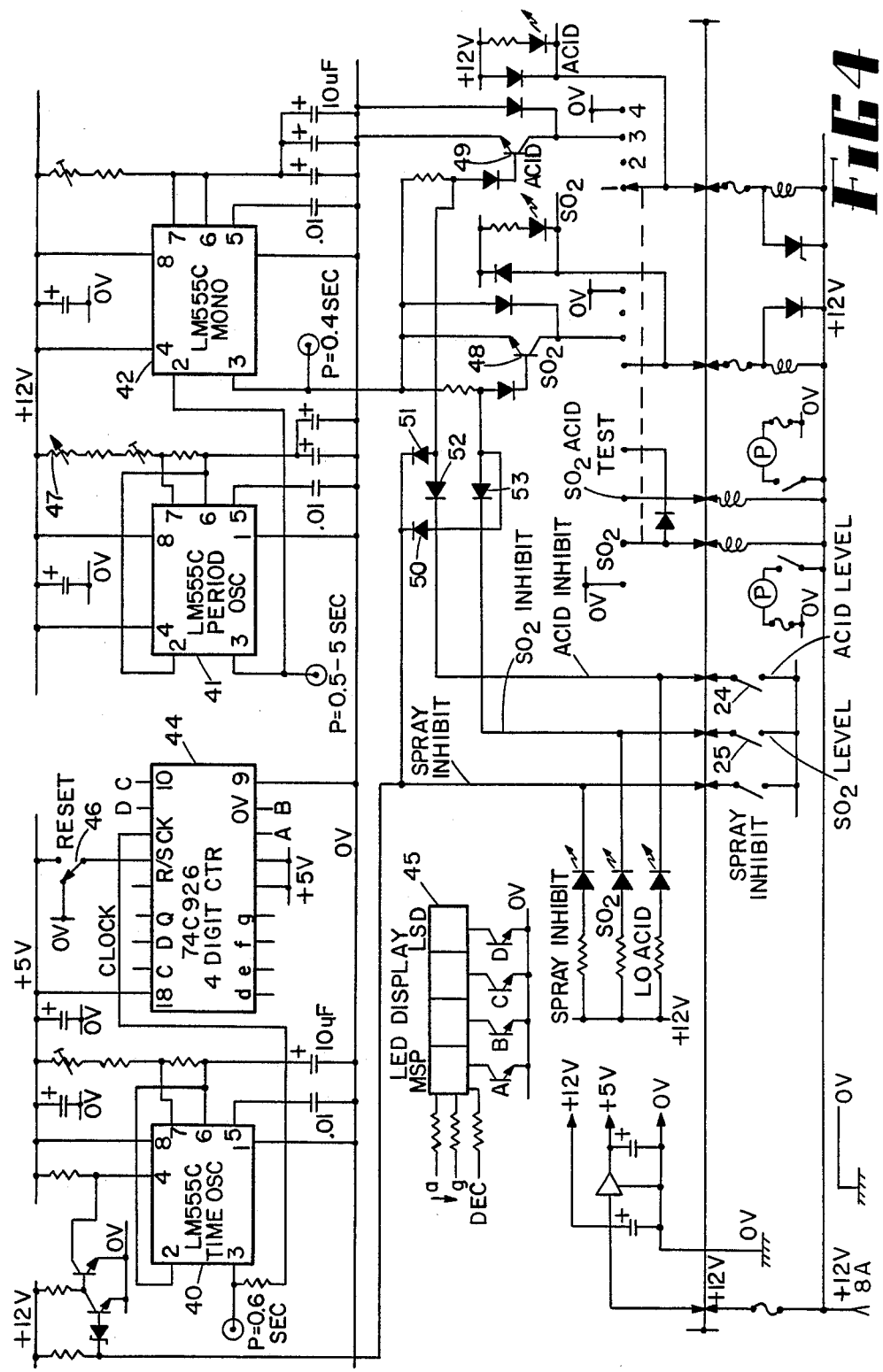

The solenoids 13 and 14 are each of the direct acting type, there being quick ON/OFF control from an electrical control voltage as described with respect to FIG. 4 If a valve is opened for a short duration, for example 0.4 seconds, then a pulse of spray will issue from the jets releasing a small amount of preservative liquid over the grapes 20, the quantity of liquid being a function of the "ON" time of the pulse.

Although the "ON" time can be utilised as a metering arrangement, it is preferable that the metering is achieved by the "OFF" time periods between successive pulses. For example a high rate of picking will have an "OFF" time of as little as 0.1 seconds while a low rate of picking may require the jets to operate only once every 2.5 seconds. Notwithstanding this however the total effect in the bin 30 is generally homogeneous. The switch 34 is adjusted to indicate the number of minutes per tonne of pulsing, giving an operator an easily controlled and accurate determination of the dosage rate.

It is an easy matter for an operator to ascertain the required dosage setting, since he can time how long it takes to fill a bin (which for example may be a 2 tonne bin). If the operator has an elapsed time indicator (for example a stop watch facility on his wrist watch) which indicates the measured time to fill a bin, the calibrated dosing rate in "minutes/tonne" is easy to continuously correct for the picking rate from bin to bin.

Although FIG. 4 is a detailed electronic circuit diagram, the following description is abbreviated since the minor functions are readily identifiable by one skilled in the electronic art.

In FIG. 4 the electronic circuit consists of three oscillators designated 40, 41 and 42 but all of identical characteristics (LM555C). Such oscillators are available from National Semiconductors in California.

The first oscillator 40 is an a-stable, running at a period of 0.6 seconds. By adding the number of output pulses in counter 44, and displaying in a light-emitting-display 45, a read-out time to 0.1 seconds is achieved. If the pause switch 36 is operated, pin 4 of oscillator 40 is disabled, causing it to cease operation. The reset switch 46 causes the counter to return to a count of zero.

The second oscillator 41 is also an a-stable, running at over one adjustable period of 0.5 to 2.5 seconds. An adjustment potentiometer 47 sets the rate of the second oscillator 41.

Each pulse of the second oscillator 41 causes the third oscillator 42 (running in a monostable mode) to give a constant 0.4 seconds output pulse.

This output pulse causes two power transistors 48 and 49 to turn on, causing the solution solenoids 14 and 13 respectively to turn on. If the pause switch 36 is activated, the pulse drive from the oscillator 42 is shunted to earth via diodes 50 and 51, and therefore the transistors 48 and 49 do not turn on.

Either of the low level tanks switches 24 or 25 will also cause respective output solenoid to become inactive, via the diodes 52 and 53. This avoids the danger of the pumps otherwise running dry.

The invention will be seen to be exceptionally simple, but it resolves a practical difficulty which has resulted in great damage and loss in the wine industry.

I claim:

1. A method of spraying grapes with preservative liquid upon harvesting, comprising the steps of:
   transporting harvested grapes from a harvester into a bin;
   spraying a series of pulses of preservative liquid over the harvested grapes as they are transported into the bin with an "OFF" time period between successive pulses during which no liquid is sprayed and n "ON" time period comprising the duration of each pulse during which liquid is sprayed; and
   controlling the rate of application of sprayed preservative liquid to the grapes in accordance with a grape picking rate by controlling at least one of the OFF and ON time periods.

2. A method according to claim 1 comprising effecting said traversing of the harvested grapes from a harvester and into said bin by a conveyor, and spraying said series of pulses through spray jets located above said conveyor 3. A method according to claim 1 comprising spraying with a series of pulses of identical duration and adjusting said "OFF" time betweeen pulses to match the quantity of sprayed preservative with the harvesting rate.

4. A method according to claim 3, comprising spraying said preservative liquid through spray jets by pumping said preservative liquid to the jets by a pump and through a solenoid valve, and effecting said adjustment of "ON" and "OFF" periods of said pulses by electronically controlling said solenoid valve.

* * * * *